(12) United States Patent
Pasquali (10) Patent No.: US 11,552,709 B2
(45) Date of Patent: Jan. 10, 2023

(54) DATA TRANSCEIVING ELECTRONIC DEVICE AND METHOD FOR DATA TRANSCEIVING THEREOF

(71) Applicant: SLUX SAGL, Lugano (CH)

(72) Inventor: Alessandro Pasquali, Riva San Vitale (CH)

(73) Assignee: SLUX SAGL, Lugano (CH)

( * ) Notice: Subject to any disclaimer, the term of this patent is extended or adjusted under 35 U.S.C. 154(b) by 132 days.

(21) Appl. No.: 17/259,530

(22) PCT Filed: Jul. 11, 2019

(86) PCT No.: PCT/IB2019/055914
§ 371 (c)(1),
(2) Date: Jan. 11, 2021

(87) PCT Pub. No.: WO2020/012401
PCT Pub. Date: Jan. 16, 2020

(65) Prior Publication Data
US 2021/0328677 A1 Oct. 21, 2021

(30) Foreign Application Priority Data

Jul. 11, 2018 (CH) .................................... 00861/18

(51) Int. Cl.
*H04B 10/40* (2013.01)
*H04B 10/079* (2013.01)
*H04B 10/11* (2013.01)
(52) U.S. Cl.
CPC ....... *H04B 10/40* (2013.01); *H04B 10/07955* (2013.01); *H04B 10/11* (2013.01)
(58) Field of Classification Search
CPC .. H04B 10/40; H04B 10/07955; H04B 10/11; H04B 10/1143; H04B 10/1149;
(Continued)

(56) References Cited

U.S. PATENT DOCUMENTS 4,846,571 A * 7/1989 Jelalian ................. G01S 7/4917
356/28.5
6,763,195 B1 * 7/2004 Willebrand .......... H04B 10/114
398/19
(Continued)

FOREIGN PATENT DOCUMENTS

DE 4433896 C1 11/1995
EP 1370014 A1 12/2003
(Continued)

OTHER PUBLICATIONS

European Patent Office, International Search Report for PCT/IB2019/055914, dated Feb. 12, 2019, European Patent Office, P.B. 5818 Patentlaan2, NL—2280 HV Rijswijk.
(Continued)

*Primary Examiner* — Hibret A Woldekidan (57) ABSTRACT

Data transceiving electronic device (100), configured to permit the establishment of at least a communication with at least an electronic device (301; 302) remotely positioned with respect to the data transceiving electronic device (100), said data transceiving electronic device (100) comprises a radio frequency module (105) configured to receive and transmit electronic data on a wireless channel according to at least a predefined first wireless communication standard, and an optical transceiver module (108) in turn comprising at least an optical transmitter (109) and an optical receiver (110); said data transceiving electronic device (100) being configured to select said optical transceiver module (108) as the preferential priority module for the establishment of said communication with said at least one electronic device (301; 302).

17 Claims, 3 Drawing Sheets

(58) Field of Classification Search
CPC .. H04B 10/1123; H04B 10/116; H04B 10/43; H04B 10/07; H04B 10/032; H04B 10/03
USPC .............. 398/115–117, 135–139, 118, 38, 5
See application file for complete search history.

(56) References Cited

U.S. PATENT DOCUMENTS

| | | |
|---|---|---|
| 8,019,224 B2 | 9/2011 | Karaki et al. |
| 2004/0032887 A1* | 2/2004 | Ahmadvand ........ H04B 10/506 372/21 |
| 2013/0279917 A1* | 10/2013 | Son .................... H04B 10/1149 398/118 |
| 2014/0376914 A1* | 12/2014 | Miniscalco ........ H04B 10/1129 398/58 |
| 2018/0062740 A1* | 3/2018 | Lange .................... H04L 67/12 |

FOREIGN PATENT DOCUMENTS

| | | |
|---|---|---|
| EP | 3291585 A1 | 3/2018 |
| WO | 2011034390 A2 | 3/2011 |
| WO | 2018041341 A1 | 3/2018 |

OTHER PUBLICATIONS

European Patent Office, Written Opinion of the International Searching Authority for PCT/IB2019/055914, dated Feb. 12, 2019, European Patent Office, P.B. 5818 Patentlaan2, NL—2280 HV Rijswijk.

* cited by examiner

DATA TRANSCEIVING ELECTRONIC DEVICE AND METHOD FOR DATA TRANSCEIVING THEREOF

FIELD OF THE INVENTION

The invention refers to the field of electronic devices, and in details refers to a data transceiving electronic device.

The present invention also refers to a method for data transceiving.

The present invention also refers to a hybrid radio frequency/optical transmission electronic device.

The present invention also refers to a computer program for data transmission.

STATE OF THE ART

In the field of telecommunications, it is known the use of network communication devices, which comprise modems or routers or access points typically equipped with radio frequency modules suitable for permitting the establishment of logic channels of communication with electronic devices remotely positioned with respect to the data transceiving electronic device. In particular, it is known that among the network communication devices, some of them permit the creation of a local network and the connection of the latter to a WAN, for example through Internet network. The electronic devices can be computers, or cellular radiotelephones or tablets or even household appliances such as fans, or ovens, or refrigerators, equipped in turn with radio frequency modules. These electronic devices, when the logic channel with the data transceiving electronic device is established, can, for example, transmit their own operational data to other electronic devices of the local area network and/or of the WAN network, and can also be electronically queried and/or programmed through said logic channel. Radio frequency modules of known type permit the establishment of logic channels of communication according to standards of known type, among which, in a non-exhaustive list, there are WiFi, Wimax, Zigbee, Bluetooth.

There are also network communication devices that simulate a repeater for radio mobile cellular telephony and therefore realize an access point to permit the establishment of a data and/or voice call. These network communication devices are in fact pseudo-repeaters that are typically installed in buildings or in places where there is no radio mobile cellular coverage, and/or where the need of a radio mobile cellular network coverage is limited in time to well predetermined and short periods.

Network communication devices that use logic radio frequency channels are characterized by some drawbacks. In particular, it has been observed that the increasingly widespread use of radio frequency network communication devices has caused numerous radio interferences among more or less neighboring devices. Furthermore, network communication devices that use radio frequency logic channels are of difficult or dangerous use in all the environments where the atmosphere is at risk of explosion. In particular, in some environments or areas, the use of radio frequency network communication devices is totally prohibited.

There are also areas in which radio-frequency interference affecting the channels used to establish communication cannot be eliminated; these areas are for example, and in a non-limiting extent, areas in which there are large voltage transformers and/or rotating electrical machines and/or sliding contacts and/or areas with the presence of instruments for thermal detection and/or radiation intensification. The significant interferences caused by these applications can typically be overcome by expensive researches of broad-spectrum communication protocols—thus worsening the spectral efficiency and increasing the request of bandwidth needed to establish and keep the communication—or by increasing the transmission power of the data transceiving electronic device.

Furthermore, the daily development of broadband technologies and applications has required the assignment of a large number of radio channels, each of which in turn must be characterized by a significant bandwidth. Currently, radio frequency communication standards are targeted to permit the maximal spectral efficiency for high bandwidth requesting data transmissions, in order to minimize the simultaneous use of multiple radio channels. The current bandwidth need has outdated several radio frequency communication protocols.

The use of radio frequency logic channels, due to the very nature of the physical channel, is subject to the risk of interception. The actual range of radio frequency communication is difficult to estimate and/or to predict in an environment with non-isotropic radio wave diffusion, as in the typical case of a data transceiving electronic device installed in a domestic environment. In this specific case, the delimitation of the effective range of the device and/or the confidentiality of the communication on the logic channel are respectively difficult to estimate and to guarantee, especially outside of the typical context of the desired environment.

All the above mentioned factors are to be measured with the actual development of electronic devices using radio frequency logic channels for data transceiving. The spread of such electronic devices, particularly after the birth of Internet Of Things, has significantly increased and this—particularly in certain heavily populated areas—has caused or is causing significant problems in terms of exhaustion of available radio channels and/or radio interference.

A purpose of the present invention is to describe a data transceiving electronic device that can solve the above described drawbacks.

Another purpose of the present invention is to describe a data transceiving method that can solve the above described drawbacks.

Another purpose of the present invention is to describe also a hybrid radio frequency/optical transmission electronic device.

Another purpose of the present invention is to describe a computer program for data transmission that can solve the above described drawbacks.

SUMMARY OF THE INVENTION

According to the present invention, a data transceiving electronic device (100) is created, configured to permit the establishment of at least a communication with at least an electronic device (301; 302) remotely positioned with respect to the data transceiving electronic device (100), said data transceiving electronic device (100) comprises a radio frequency module (105) configured to receive and transmit electronic data on a wireless channel according to at least a predefined first wireless communication standard, and an optical transceiver module (108) in turn comprising at least an optical transmitter (109) and an optical receiver (110); said data transceiving electronic device (100) being configured to select said optical transceiver module (108) as the preferential priority module for the establishment of said communication with said at least an electronic device (301; 302).

According to another non-limiting aspect, said data transceiving electronic device (100) is configured to select said radio frequency module (105) as a secondary module for the establishment of said communication with at least an electronic device (301; 302) and to establish said communication on a radio-frequency channel when the establishment of said communication on an optical channel with said electronic device (301; 302) is not possible and/or when the power of an optical signal received on said communication on the optical channel falls below a predefined threshold value (Pth).

According to another non-limiting aspect, said optical transceiver module (108) comprises at least an optical power comparator configured to compare the power of an optical signal used for said communication on the optical channel with a predefined threshold value (Pth); said optical power comparator being configured to cause a switching of said communication from said radio frequency channel to said optical channel when the power of said optical signal remains below said predefined threshold value (Pth).

According to another non-limiting aspect, said optical power comparator is configured to keep said communication on said radio frequency channel as long as the optical signal power remains below said predefined threshold value (Pth).

According to another non-limiting aspect, said data transceiving electronic device (100) is configured to iteratively attempt the establishment of the communication on the optical channel and/or the re-establishment of the communication on the optical channel at predefined time intervals and/or when the optical signal power is higher than said predefined threshold value (Pth).

According to another non-limiting aspect, said data transceiving electronic device (100) is configured to cause the sending of a search optical signal for electronic devices (301; 302) by means of said optical transceiver module (108).

According to another non-limiting aspect, said optical transceiver module (108) has at least a search operational configuration for remote electronic devices wherein it cyclically transmits, through the optical transmitter (109), a search optical signal for electronic devices (301; 302) and after which it establishes said communication on the optical channel when it has received an optical response signal from at least one of said remote electronic devices (301; 302).

According to another non-limiting aspect, the optical response signal is a signal transmitted by said electronic device (301; 302) according to a predetermined format or scheme, and/or comprises a predetermined response data.

According to another non-limiting aspect, said radio frequency module (105) is a module configured to transmit data signals according to and/or in accordance with a plurality of predefined data transmission protocols.

According to another non-limiting aspect, said data transceiving electronic device (100) comprises a data-processing unit (104) electrically connected to said radio frequency module (105) and to said optical transceiver module (108).

According to another non-limiting aspect, said data processing unit (104) is configured to select and/or activate said optical transceiver module (108) as a priority module on said radio frequency module (105).

According to another non-limiting aspect, said data transceiving electronic device (100) is a multi-communicator device, configured to establish and/or keep simultaneous communications on a plurality of channels, said channels being optical and/or radio frequency channels.

According to another non-limiting aspect, said data processing unit (104) is configured to control the optical transceiver module (108) on said search operational configuration of remote electronic devices even when a radio frequency and/or optical communication is already established on said radio frequency and/or optical channel respectively.

According to another non-limiting aspect, said optical transceiver module (108) is configured to manage a plurality of simultaneous optical communications on a plurality of optical channels.

According to another non-limiting aspect, said optical channels are separated in frequency.

According to another non-limiting aspect, said optical channels are at least partially superimposed in frequency.

According to another non-limiting aspect, said optical channels comprise logic channels which are subdivided by time division or by Time Division Multiplexing.

According to another non-limiting aspect, said optical channels comprise logic channels subdivided with orthogonal frequency multiplexing technology.

According to another non-limiting aspect, said optical transmitter (109) comprises a photoemitter that can be tuned on a plurality of frequencies and/or colours.

According to another non-limiting aspect, said optical transmitter (109) is configured to produce an output modulated optical radiation with a variation in the angle of polarization.

According to another non-limiting aspect, said optical receiver (110) is configured to demodulate an input optical radiation received by means of an analysis or measurement of the angle of polarization of said optical radiation, and/or by means of an analysis or measurement of a variation of the angle of polarization that said optical radiation assumes over time.

According to another non-limiting aspect, said optical transmitter (109) comprises a plurality of monochromatic photoemitters, in particular at least a first and a second monochromatic photoemitter, wherein the first monochromatic photoemitter operates on a first predetermined wavelength or frequency or colour, and wherein the second monochromatic photoemitter operates on a second predetermined wavelength or frequency or colour.

According to another non-limiting aspect, said optical transmitter (109) comprises an optical coupling device for said first and said second monochromatic photoemitter.

According to another non-limiting aspect, said optical transceiver module (108) is electrically connected to said radio frequency module (105), and is configured to transfer in frequency a radio frequency signal produced at the output by said radio frequency module (105), transporting it in the optical frequency domain.

According to another non-limiting aspect, said optical transceiver module (108) comprises an input electrically connected to the radio frequency module (105) and comprises at least an operating configuration wherein the optical transmitter (109) transmits an optical signal modulated by said radio frequency signal.

According to another non-limiting aspect, said optical signal is an optical signal modulated in amplitude by means of the radio-frequency signal.

According to another non-limiting aspect, said radio-frequency signal transferred in frequency and/or used as modulating signal of the optical signal is a radio-frequency signal according to a predefined radio-frequency communication standard, optionally at least one of the following standards: WiFi included IEEE802.11x, Bluetooth, WiMax or IEEE 802.16, WiBro, WirelessUSB, NFC, RfID, Hyperlan, GSM and 2G-5G communication standard, in particular, GRPS, EDGE, HSDPA, W-CDMA, LMDS, DECT, ZigBee, Ant+, EnOcean, ESP8266, HART, PMR, dPMR, Tetra, APCO-P25, NXDN or other protocols based on FDMA.

According to another non-limiting aspect, said optical signal is an optical signal carrying an encoded data set without alteration of the original protocol, optionally with the exception of the physical layer according to the OSI model or with the alteration of the physical channel of transmission of the signal.

According to another non-limiting aspect, said optical signal is a signal modulated according to an AM/FM hybrid modulation scheme and/or said optical transmitter (109) is an AM/FM hybrid optical transmitter. Advantageously, the Applicant has noted that the AM/FM hybrid modulation permits to optimize the reception of the optical querying signal even in case of reflections or diffusions that involve a significant attenuation.

According to another non-limiting aspect, said data transceiving electronic device (100) comprises a network interface (101) operatively and preferably electrically connected to said radio frequency module (105) and to said optical transceiver module (108), said network interface (101) having an input/output port (102) through which, in use, said data transceiving electronic device (100) can, and/or is configured to, transceive electronic data on a communication network (103).

According to another non-limiting aspect, said radio frequency module (105) comprises at least a first antenna (106) and optionally a second antenna (107) for the transceiving of said radio frequency signal.

According to another non-limiting aspect, the first antenna (106) is an antenna resonating on a first radio frequency band and the second antenna (107) is an antenna resonating on a second radio frequency band; said first radio frequency band being distinct or separated from the second radio frequency band.

According to another non-limiting aspect, the data transceiving electronic device is a network data transceiving electronic device or an electronic network communication device, and in particular is, and/or comprises, a router or an access point, or a modem and/or is a hotspot.

According to the present invention it is also realized a data transceiving method, said method comprising:
  a step of establishment of a data communication between a data transceiving electronic device (100), configured to manage wireless communications on a radio frequency channel (200) and/or an optical channel (400a, 400b), and at least an electronic device (301; 302) remotely positioned with respect to said data transceiving electronic device (100), wherein said data communication is an at least partially wireless communication,
  a subsequent step of transmission of at least part of a data signal through said data communication previously established;
wherein the step of the establishment of data communication comprises the establishment of a priority optical communication by means of a preferential decision step for the establishment of a communication channel (1003), wherein said optical channel (400a, 400b) is electronically established between said data transceiving electronic device (100) and said at least an electronic device (301); 302) with a preferential alternative selection (1005) with respect to the establishment (1004) of the communication on said radio-frequency channel (200) between said data transceiving electronic device (100) and said at least an electronic device (301; 302).

According to another non-limiting aspect, said method comprises a measurement step (1006) of an optical power (Popt) on optical signals exchanged on said optical channel (400a, 400b), and comprises the comparison of said optical power (Popt) with a predetermined threshold value (Pth) of optical power.

According to another non-limiting aspect, said method comprises a step of switching the data communication from said optical channel (400a, 400b) to said radio frequency channel (200) when the optical power (Popt) is lower than said threshold value (Pth) and comprises a step of search to re-establish said optical communication wherein the communication is automatically brought from said radio frequency channel (200) to optical channel (400a, 400b) when the optical power is again higher than said threshold value (Pth).

According to another non-limiting aspect, said search step to re-establish the aforesaid optical communication comprises the sending of an querying optical signal between said electronic data transceiver (100) and said electronic device (301; 302).

According to another non-limiting aspect, said querying optical signal is sent by said data transceiving electronic device (100), in particular by an optical transmitter (109) of an optical transceiver module (108) of said transceiver.

According to another non-limiting aspect, said method comprises a search step (1000; 1002) of electronic devices (301; 302) capable of establishing a wireless communication on an optical channel, said search step comprising a transmission (1000) of a search or querying signal and a waiting step (1002) of the transmission of a response signal by at least an electronic device (301; 302).

According to another non-limiting aspect, said search step is a step cyclically executed at predetermined instants of time and/or the transmission (1000) of the search or querying signal, in said step, is executed at predetermined instants of time.

According to another non-limiting aspect, a data processing unit (104) of said transceiver device controls the execution of at least said search step and/or the establishment of communication.

According to another non-limiting aspect, said method, following the reception of said response signal, comprises a decision step for the establishment of a preferential communication channel (1003), wherein:
  If the response signal is a radio-frequency signal or carries data related to the sole possibility for said electronic device (301; 302) to establish a communication on a radio-frequency channel, the step of establishment of the communication comprises the establishment of the communication on said radio-frequency channel (200);
  if the response signal is an optical signal, or carries data related to the possibility for said electronic device (301; 302) to establish a communication on an optical channel, the step of establishment of the communication comprises the establishment of the communication on said optical channel (400a, 400b).

According to another non-limiting aspect, said step of preferential establishment of communication channel (1003) is a step in which if the response signal is a radio frequency signal but carries data related to the possibility for said electronic device (301, 302) to establish a communication on an optical channel, the step of establishment of the communication comprises the establishment of the communication on said optical channel (400a, 400b).

According to another non-limiting aspect, said method, when said communication is established on the radio frequency channel (200), comprises the transmission of a plurality of data according to a predefined standard of radio frequency communication, optionally at least one among the following standards: WiFi including IEEE802.11x, Bluetooth, WiMax or IEEE 802.16, WiBro, WirelessUSB, NFC, RfID, Hyperlan, GSM and 2G-5G communication standards, in particular, GRPS, EDGE, HSDPA, W-CDMA, LMDS, DECT, ZigBee, Ant+, EnOcean, ESP8266, HART, PMR, dPMR, Tetra, APCO-P25, NXDN or other FDMA-based protocols.

According to another non-limiting aspect, said method comprises a step of establishment of at least a first and a second simultaneous communication, each of which is established between the transceiver device (100) and—respectively—a first electronic device (301) and a second electronic device (302), said first and said second communication being both on optical channel (400a, 400b).

According to another non-limiting aspect, said first and said second communication are on a first optical channel and on a second optical channel (400a; 400b) which are distinct between them.

According to another non-limiting aspect, said first optical channel (400a) is separated in frequency from said second optical channel (400b).

According to another non-limiting aspect, said first optical channel (400a) and said second optical channel (400b) are at least partially superimposed in frequency and are multiplexed by division of time.

According to another non-limiting aspect, said first optical channel (400a) and said second optical channel (400b) comprise logic channels subdivided with the technique of orthogonal frequencies multiplexing.

According to another non-limiting aspect, said method comprises a step of establishment of at least a first and a second simultaneous communication, each of which is established between the transceiver device (100) and—respectively—a first electronic device (301) and a second electronic device (302), said first and said second communication being or taking place, respectively, one on said radio frequency channel (200) and one on said optical channel (400a; 400b).

According to another non-limiting aspect, said method comprises:
a step of definition of a plurality of electronic data to be transmitted by means of said communication,
a step of processing of said electronic data according to a predefined protocol or electronic data coding standard for wireless transmission on a radio frequency channel and/or to provide said electronic data to a radio frequency module (105) providing on its output a signal in the radio frequency domain.

According to another non-limiting aspect, said method comprises also:
a subsequent conversion of electronic data processed according to the predefined electronic data coding standard for wireless transmission on a radio frequency channel in the optical frequency domain; or
a subsequent conversion of the output signal from said radio frequency module (105) into the optical frequency domain.

According to another non-limiting aspect, the conversion takes place leaving the electronic data coding protocol unchanged, optionally except for an adaptation of the physical layer of the protocol, if defined, in accordance with the OSI model and/or with the alteration of the physical channel of transmission of the signal.

According to another non-limiting aspect, the communication on said optical channel (400a; 400b) comprises the transceiving of optical signals modulated according to a hybrid AM/FM modulation scheme.

According to another non-limiting aspect, the communication on said optical channel (400a; 400b) comprises the transceiving of optical signals modulated according to a modulation scheme varying the angle of polarization of the optical radiation.

According to another non-limiting aspect, said method comprises a transmission step of an optical signal modulated by a variation of the angle of polarization of the optical radiation.

According to another non-limiting aspect, said method comprises a step of driving of an optical transceiver module (108) of said data transceiving electronic device (100), in particular an optical transmitter (109) of said optical transceiver module (108), in order to produce at the output an optical radiation modulated by a variation of a polarization angle of the optical radiation produced at the output of said optical transmitter (109).

According to another non-limiting aspect, said variation of the angle of polarization of the optical radiation is a function of the modulating signal and/or of said data received at the input by said optical transceiver module (108).

According to another non-limiting aspect, said method comprises a demodulation step of an optical radiation received in the context of said communication on said optical channel (400a, 400b), said demodulation step comprising a measurement step of the variation of a polarization angle assumed over time by the received optical radiation, and a reconstruction step of a data signal, in particular executed by an optical receiver (110) or by means of an optical receiver (110) of said optical transceiver module (108).

According to another non-limiting aspect, said method comprises a step for the transceiver of at least part of the electronic data exchanged in said communication over a communication network (103), in particular an internet network, by means of a step of supply of at least part of said electronic data to a network interface (101) of the transceiver device (100), wherein the network interface (101) has an input/output port configured to be in use connected to said communication network (103).

According to another non-limiting aspect, said method comprises providing on said optical channel (400a, 400b) a plurality of optical signals each centred on its own carrier distinct from the carriers of the remaining optical signals of said plurality of optical signals.

According to another non-limiting aspect, in said plurality of optical signals, at least a first optical signal comprises electronic data encoded according to a first predefined protocol or electronic data coding standard for wireless transmission on a radio frequency channel, and a second optical signal comprising electronic data encoded according to a second protocol or electronic data coding standard for wireless transmission on a radio frequency channel, said second protocol or coding standard being different from said first protocol or coding standard.

According to the present invention, a computer program is also realized, suitable to be executed on at least a data processing unit of a first electronic device (100; 301; 302) having a radio frequency module, configured to permit the establishment of a data transceiving on a radio frequency channel with an additional electronic device remotely positioned, and an optical transceiver module, configured to permit the establishment of a data transceiving on an optical channel (400a, 400b) with an additional electronic device remotely positioned with respect to the first electronic device, wherein the computer program comprises portions of software which, when executed by said data-processing unit, cause the activation and/or priority selection of the optical transceiver module for the establishment of said communication on said optical channel (400a, 400b) with said additional electronic device, wherein communication on said optical channel (400a, 400b) is kept, as far as possible, prioritary with respect to communication on said radio-frequency channel (200).

According to another non-limiting aspect, said computer program comprises portions of software code which, when executed on said data-processing unit, cause the execution of a repeated electronic measurement of the power (Popt) of an optical signal received from an optical receiver of said optical transceiver module, and automatically cause the switching of the preset optical channel communication to a radio frequency channel communication if the power (Popt) of the optical signal falls below a predetermined threshold value (Pth) previously stored in a memory operationally accessible by said data processing unit and automatically cause the switching of the communication on a radio frequency channel when the power (Popt) of the optical signal rises above said predetermined threshold value (Pth) and/or cause the keeping of said communication on said optical channel as long as the power (Popt) of said optical signal remains above the predetermined threshold value (Pth).

According to another non-limiting aspect, said optical channel is a channel in which optical radiations are used in the range of infrared, visible spectrum or ultraviolet.

According to another aspect, the invention concerns the use of the data transceiving electronic device (100) according to one or more of the preceding aspects, as an electronic device for the conversion of data signals from the radio frequency domain to the optical domain.

According to another aspect, the invention concerns the use of the electronic data transceiving electronic device (100) in accordance with one or more of the preceding aspects, as data transceiving electronic device of multimedia signals, in particular audio.

According to another aspect, the invention concerns a method of signal transceiving, said method comprising a step of generation of a data signal encoded according to a predefined protocol or coding scheme in radio frequency or in the radio frequency domain to generate a radio frequency signal, said step being executed through a radio frequency module (105) equipped with at least a radio transmitter, said method comprising a subsequent step of conversion of said radio frequency signal into an optical signal, by means of at least an optical transmitter module (109) in which said optical transmitter module (109) performs a translation of said radio frequency signal into the optical domain, without altering the coding protocol of said signal.

According to another aspect, the invention concerns a method of signal transceiving, said method comprising a reception step of a data signal encoded according to a predefined protocol or coding scheme in radio frequency or in the radio frequency domain wherein the data signal is comprised in a radio frequency signal, said reception being executed by at least an antenna (106, 107) of a first radio frequency module (105), said method comprising a subsequent step of conversion of said radio-frequency signal into an optical signal, by means of at least an optical transmitter module (109) electrically connected to said first radio-frequency module (105), wherein said optical transmitter module (109) performs a translation of said radio-frequency signal into the optical domain, without altering the coding protocol of said signal.

According to another non-limiting aspect, said method comprises a step of transmission of said optical signal towards an optical receiver (110), in particular an optical receiver (110) remotely positioned with respect to said optical transmitter (109), said optical receiver being configured to convert and/or translate said optical signal into a radio frequency signal, keeping unchanged said coding protocol, creating a reconstructed radio frequency signal for reception.

According to another non-limiting aspect, said method also comprises a step of transmission of the radio frequency signal reconstructed by reception, by means of a transmitter contained in a second radio frequency module (105) and electrically connected to said optical receiver (110), both part of a remote electronic device, said step of transmission being performed by an antenna (106, 107) of said second radio frequency module (105) or electrically connected to said second radio frequency module.

According to another non-limiting aspect, said multimedia signals are streaming multimedia signals.

For the purposes of this invention, the following definitions will also apply:

'Infrared' or 'infrared' means an electromagnetic radiation which has a wavelength indicatively comprised between 0.7 µm and 15 µm.

'Visible' or "visible spectrum' means an electromagnetic radiation which has a wavelength indicatively comprised between 390 nm and 700 nm.

'Ultraviolet' or 'ultraviolet' means an electromagnetic radiation which has a wavelength indicatively comprised between 400 nm and 10 nm.

channel 'without wires' or 'wireless' channel means a communication or channel in the radio frequency domain and/or optical domain, in particular as above defined.

BRIEF DESCRIPTION OF THE DRAWINGS

The invention will now be described in one or more preferred and non-limiting forms of embodiment with reference to the attached figures, in which.

DETAILED DESCRIPTION OF THE INVENTION

Figure 1:
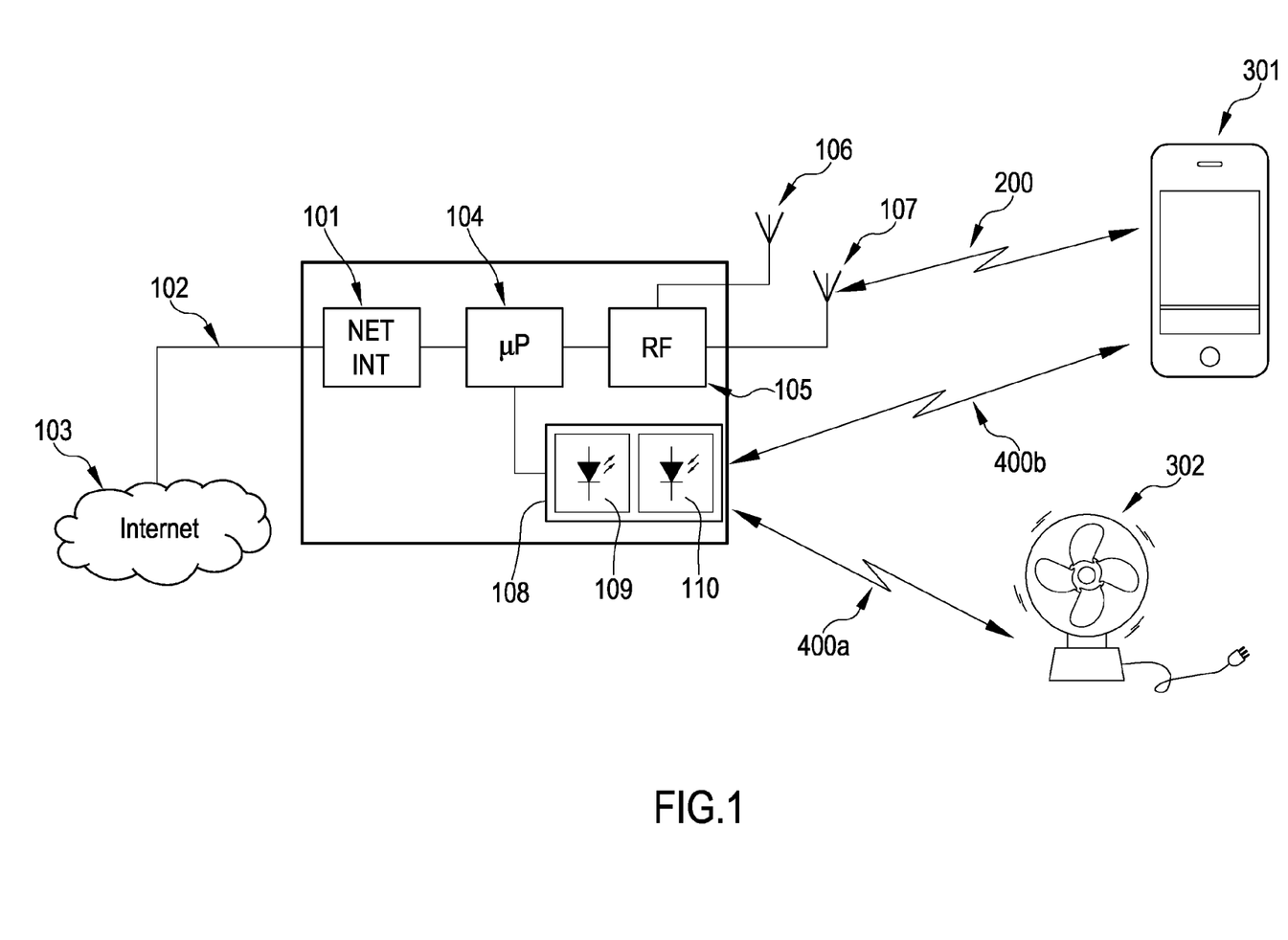
FIG. 1 shows a logic scheme of a data transceiving electronic device according to the invention.

FIG. 1 shows a block diagram of a preferred and non-limiting embodiment for a data transceiving electronic device 100, which in particular—as shown in FIG. 1 itself—is configured to establish an at least partially wireless communication; in particular, this device can be an electronic network communication device, suitable for and configured to act as a modem, or hotspot, or router or access point for the realization of a data transceiver on a wireless channel, in particular a wireless local area network and/or to act as a pseudo-repeater for the transmission of a mobile telephony signal and, furthermore, to connect to another communications network, indicated in FIG. 1 with the reference number 103, such as, for example, and in a non-limiting extent, the Internet network or, for example, and non-limiting to a WAN, external to the device here described. The device object of the invention can be physically realized as a desktop device or, alternatively, be realized as a portable device. For this reason, the data transceiving electronic device 100 can be powered by an external power supply or by a battery, comprising a rechargeable one, housed inside it.

The data transceiving electronic device 100 comprises at least an optical transceiver module 108 and a radio frequency module 105, respectively configured to permit the transceiving of signals in the optical domain, in particular in the infrared and/or visible and/or ultraviolet frequency range, and to permit the transceiving of signals in the radio frequency domain.

Preferably, but in a non-limiting extent, as shown in FIG. 1, the data transceiving electronic device 100 can also be equipped with a data processing unit 104, designed to control and/or supervise the functioning of the radio frequency module 105 and the optical transceiver module 108.

FIG. 1 shows a particular embodiment of the data transceiving electronic device object of the invention, also comprising a network interface 101, equipped with a port 102, in particular a port for the transceiving of data with bidirectional flow or input/output, through which the device is able to receive and transmit data respectively to or from the communications network 103. In this case, the data processing unit 104 also controls the network interface 101.

Through the radio frequency module 105 and through the optical transceiver module 108 it is advantageously possible to establish a communication, optical and/or in the domain of radio frequencies, with a plurality of electronic devices remotely positioned with respect to the data transceiving electronic device 100 itself. In FIG. 1 it is shown a particular configuration in which the electronic devices with which the data transceiving electronic device 100 establishes a connection comprise a radiomobile cellular phone 301 and a household appliance 302, in figure shown as a fan, each of which is equipped with a wireless communication module that can comprise optical and/or radio frequency transceivers. Furthermore, in a not shown network configuration, the data transceiving electronic device 100 can also be placed in communication with additional data transceiving electronic devices 100.

The radio frequency module 105 preferably but non-limiting operates according to one or more of the standards for the creation and management of wireless local area network communications, among which there are, in a non-exhaustive list, the protocols: WiFi including IEEE802.11x, Bluetooth, WiMax or IEEE 802.16. Other protocols that can be managed through the radio frequency module 105 are also: WiBro, WirelessUSB, NFC, RfID, Hyperlan, and communication protocols for GSM mobile phone standards and 2G-5G communication standards, in particular, GRPS, EDGE, HSDPA, W-CDMA, LMDS, DECT, or communication protocols for applications such as IoT (Internet of Things) among which ZigBee, Ant+, EnOcean, ESP8266, HART. Furthermore, the radio frequency module can manage digital radio transmissions according to standards known for point-to-point or point-to-multipoint transmission or simulcasts, such as for example and non-limiting to: PMR, dPMR, Tetra, APCO-P25, NXDN or other protocols based on FDMA. Data that are encoded using the above protocols are either plain data or alternatively encrypted data.

In a preferred embodiment, the optical transceiver module 108 comprises an optical transmitter 109 and an optical receiver 110. For example, the optical transmitter 109 can integrate a photoemitter, and the optical receiver 110 can integrate a photodiode. The photodiode of the optical receiver can be an avalanche photodiode and/or a broadband photodiode, in particular suitable and/or configured to permit the reception of data transmitted at high speed, even above 100 Mbps. When necessary, the optical photo-receiver 110 can be configured to permit the reception of data transmitted at a speed higher than 1 Gbps.

The photoemitter 109 can be a semiconductor photoemitter, for example a LED diode or any other type of photoemitter operating in the infrared and/or visible and/or ultraviolet range or even a photoemitter capable of spanning the entire optical domain as previously defined. In a particular embodiment of the invention, the photoemitter 109 can be a tuneable photoemitter, in which the emitted optical radiation can be centered by means of an appropriate command on a particular wavelength value or frequency or color. If the diode is used to produce light radiation in the ultraviolet range, for example, but in a non-limiting extent, gallium nitride doped with zinc or aluminium or indium can be used. Conversely, where the diode is used to produce light radiation in the infrared range, for example, but in a non-limiting extent, gallium arsenide or gallium-aluminium arsenide can be used. The LED diode can be an organic LED diode.

The Applicant has noted that the LED diode permits a radiation with a rather wide spectrum in azimuthal terms, and in some applications substantially isotropic azimuthally and/or zenithally. If high powers or anyway optical signals transmissions on particularly confined sectors are required, the optical transmitter 109 can integrate lenses for focusing the optical radiation emitted by the photoemitter or alternatively it can use lasers, such as semiconductor lasers.

Figure 4:
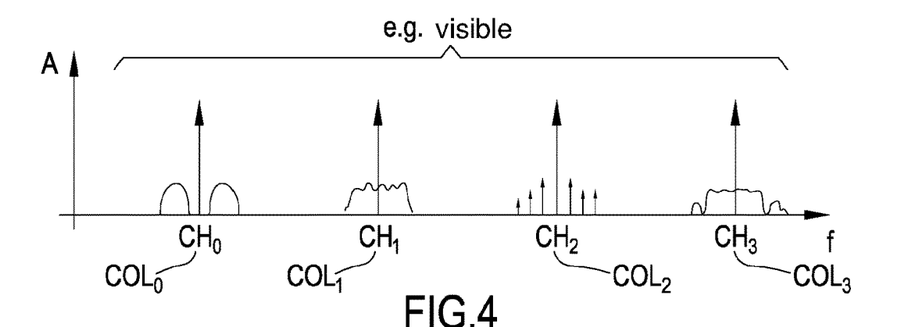
FIG. 4 shows a spectral diagram.

Alternatively, or in combination with, the optical transmitter 109 can therefore integrate a plurality of narrowband photoemitters, each tuned to its own frequency or wavelength or colour, or broadband photoemitters. This aspect permits to the optical transmitter to manage, even simultaneously, the transmission of various streams of data on separate optical logic channels or in any case different by frequency or wavelength, as in the case schematically shown in FIG. 4. This figure shows a diagram frequency/amplitude where it is possible to see an output spectrum of an optical signal that is produced at the output of the optical transmitter 109. The optical channel shows a plurality of sub-channels or logic channels CH0-CH3, each of which is characterized for example by a particular color COL1-COL3, and is centered on its own carrier frequency around which develops the spectrum of the signal of interest for the respective sub-channel or logic channel. The possibility of transmitting several optical subchannels, even simultaneously, by frequency division, permits to transmit data of heterogeneous type and/or encoded according to heterogeneous protocols.

Therefore, the data transceiving electronic device 100 can be used as an electronic data transceiver for multimedia signals, particularly audio. In particular, said multimedia signals are streaming multimedia signals, i.e. transmitted by flow from a source, remote with respect to the electronic device, to the latter, by means of a telematic network such as, for example, and in a non-limiting extent, the communications network 103, to be reproduced as they arrive at their destination, possibly with the support of a buffer that can be contained, optionally, in the data transceiving electronic device 100 and in particular in the network interface 102.

Figure 5:
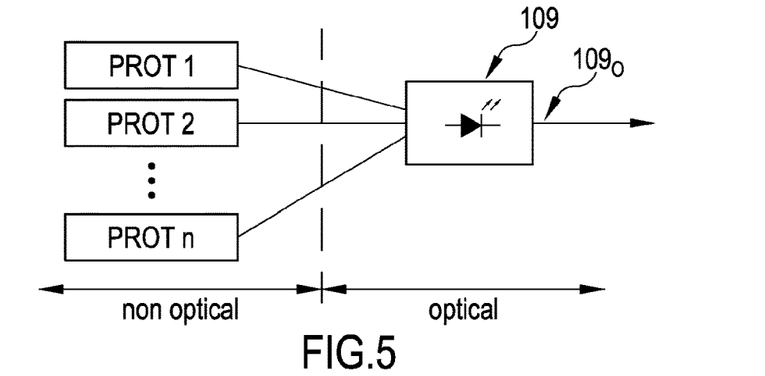
FIG. 5 shows a first configuration of a more than one standard optical communication.
Figure 6:
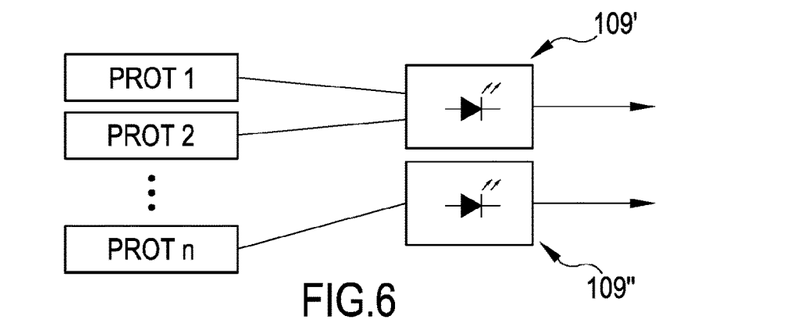
FIG. 6 shows a second configuration of a more than one standard optical communication.

As it is shown in FIG. 5, in a particular, non-limiting embodiment, the data transceiving electronic device 100 can be configured to permit the power supply of the optical transceiver module 108, and in particular the optical transmitter 109, by means of a plurality of data signals each encoded according to a particular protocol which in FIG. 5 is indicated with the PROT1-PROTn references. These protocols can, for example, be protocols not necessarily intended for optical communications. The power supply of the plurality of data signals can, for example, and in a non-limiting extent, take place by means of an amplitude modulation of the optical radiation emitted by the optical transmitter 109. Alternatively, data signals encoded according to the particular PROT1-PROTn protocol can be previously processed by means of an intermediate frequency transposition in the radio frequency domain, in order to recreate the set of CH0-CH3 subchannels from the radio frequency band. If the subchannels are separated from each other in frequency, for example by a suitable buffer band, it is possible to add them together and send them at the input to the optical transmitter 109 to modulate the optical radiation amplitude in order to generate an optical signal 109 or multi-channel.

When the optical transmitter 109 is equipped with a plurality of photoemitters 109', 109'', for example a first photoemitter 109' and a second photoemitter 109'', more precisely a wide band photoemitter 109' and a narrow band photoemitter 109'', it will be possible to transmit or supply several data signals simultaneously, each centered on its own carrier frequency, to the wide band photoemitter 109' and to transmit or supply to the narrow band photoemitter 109'' only a single data signal encoded by means of a particular or predetermined protocol.

If the first photoemitter 109' is tuned on a frequency or wavelength or colour that is distinct with respect to the frequency or wavelength or colour on which the second photoemitter 109'' is tuned, the separation of the optical channels is optimised.

In a preferred and non-limiting embodiment, in the data transceiving electronic device 100 the radio frequency module 105 and the optical transceiver module, in particular the optical transmitter 109, are electrically connected or anyway operationally connected. The electrical or operational connection between the radio frequency module 105 and the optical transmitter 109 is designed, among other things, to permit the transfer in the optical domain of radio frequency signals originally encoded according to a known communication scheme or protocol, or even better standard, without its alteration except for the value of the carrier frequency over which the encoded data pass, which then passes from the domain of radio frequencies to the optical domain preferably through a rigid translation of the spectrum. This is the solution schematically shown in FIG. 3, in which an analogic signal 500 or a stream of numerical data 500 is supplied as input to the radio frequency module 105 that in this case is configured to perform the encoding of the input signal according to a predetermined protocol or encoding standard. The radio frequency signal produced on the output of the radio frequency module 105 is placed at the input of the optical transmitter 109 which in turn generates an optical signal a(t) on its output 1090 which, on the carrier identified by the specific colour, or wavelength or working frequency or on which it is tuned, transmits substantially unchanged the signal placed at the input.

Figure 3:
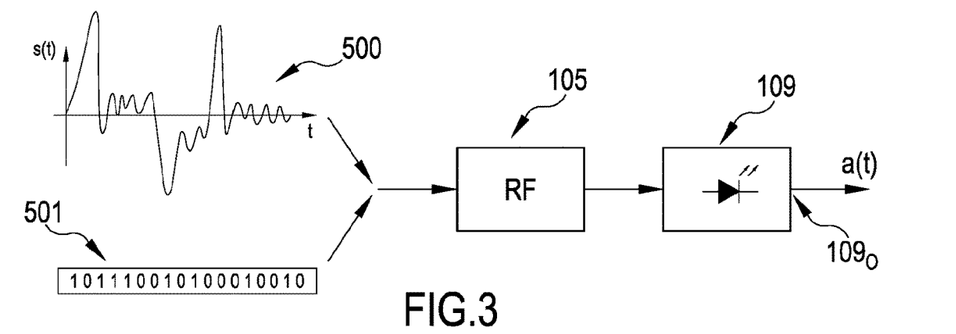
FIG. 3 shows a block diagram of a particular type of modulation realized through a specific embodiment of the electronic device for data transmission according to the invention.

In particular, therefore, a particular embodiment of the data transceiving electronic device 100, or a particular operational configuration, can be such as to simply cause a conversion in the optical domain of a radio frequency signal modulated according to a predefined modulation scheme, and in particular in accordance with a communication protocol for wireless radio communications. In this case at least one between the first and the second antenna 106, 107 are used to receive a radio frequency signal, which is transmitted to the radio frequency module 105 which, without processing the signal and in particular without altering the coding protocol, for example only amplifying it or reducing electrical noise, provides to retransmit it to the optical transceiver module, so as to cause a conversion into the optical domain. When the device is configured as described above, it can be used in association for example with a standard Wi-Fi modem, to convert the signal according to the standard Wi-Fi communication protocol, based on the IEEE 802.11 standard, on a physical optical channel. In this way, it is possible to transfer the received signal to another domain, keeping unchanged the peculiarities of the coding previously carried out, for example by extending the range of action of the Wi-Fi modem without causing an increase in the radio frequency power emitted by it, and therefore being able to extend the range of action also to environments where, for various reasons, it may not be convenient or impossible to have reception of signals in the radio frequency domain. The same device can also be configured to receive an optical signal originating from a radio frequency signal encoded according to a predefined signal encoding protocol for wireless radio frequency communications, and to translate the received optical signal into a radio frequency band, without adaptation of the aforementioned encoding protocol, and send the thus translated signal from the optical receiver 110 to the radio frequency module 105, which, without processing, retransmits it towards at least one between the first and the second antenna 106, 107. This conversion configuration to and from the optical domain permits to associate the device object of the invention in an extremely flexible way with pre-existing radio devices.

For this reason, through one or more devices as described above, it is possible to realize a method of signal transceiving, which comprises a step of data signal generation encoded according to a predefined protocol or coding scheme in radio frequency or in the radio frequency domain to generate a radio frequency signal, said step being performed by a radio frequency module 105 equipped with at least a radio transmitter; the method then comprises a subsequent step for the conversion of said radio-frequency signal into an optical signal, by means of at least an optical transmitter module 109, wherein the optical transmitter module performs a translation of said radio-frequency signal into the optical domain, without altering the coding protocol of said signal, or also a method for the transceiving of signals, which comprises a step for the reception of a data signal encoded according to a predefined radio-frequency coding protocol or scheme or in the radio-frequency domain where the data signal is comprised in a radio-frequency signal, said reception being performed by at least an antenna 106, 107 of a first radio-frequency module 105, said method comprising a subsequent step for the conversion of said radio-frequency signal into an optical signal, by means of at least an optical transmitter module 109 electrically connected to said first radio-frequency module 105, in which said optical transmitter module 109 performs a translation of said radio-frequency signal into the optical domain, without altering the coding protocol of said signal.

In particular, the method comprises a step for the transmission of said optical signal to an optical receiver 110, in particular an optical receiver 110 remotely positioned with respect to said optical transmitter 109, where the receiver is configured to convert and/or translate the optical signal into a radio frequency signal, keeping unchanged said coding protocol, creating a radio frequency signal reconstructed for reception. Moreover, the method also comprises a step of transmission of the radio frequency signal reconstructed by reception, by means of a transmitter contained in a second radio frequency module 105 and electrically connected to the optical receiver 110, both part of a remote electronic device, said step of transmission being performed by an antenna 106, 107 of said second radio frequency module 105 or electrically connected to the second radio frequency module.

Thanks to this aspect, it is possible to reduce the presence of radio frequency channels while keeping the compatibility with existing wireless radio communication protocols, and therefore to use the data transceiving electronic device 100 object of the invention even in those environments where the use of signals in the domain of radio frequencies is inadvisable or prohibited, such as for example particular areas of hospitals or deposits of combustible or explosive materials; radio pollution is also reduced. The Applicant has noted in particular that the very high bandwidth available in the optical domain permits the simultaneous transmission, on different optical carriers, of signals that in the radio domain would be conflicting because of their extremely wide bandwidth, such as, for example, and in a non-limiting extent, multi-channel high-definition audio data streams, or video or audio/video streams UHD. In other words, the device object of the present invention is able to perform a step of establishment of at least a first and a second simultaneous communication, each of which is established with a respective first electronic device 301 and respectively second electronic device 302 using two distinct channels, of which a first channel for optical transceiver to the first electronic device and a second channel for optical transceiver to the second electronic device.

In a particular embodiment, the optical transceiver module 108 can be configured, alternatively to the operation as described above, to cause the modulation of data signals according to hybrid AM/FM modulation schemes, in which in particular the data signal is first modulated in amplitude, in particular on a carrier signal having a first frequency f1, producing an output signal m(t) modulated in amplitude, and then using the signal m(t) as a signal modulating in frequency an additional signal, in a cascade of an AM modulation followed by an FM modulation. The Applicant has noted that this modulation scheme is particularly effective in the case of indirect optical transmission, by reflection or diffusion, since even very low transmission powers can be sufficient to permit the correct reception of the data carried by the optical signal.

Alternatively or in combination with the above mentioned modulation, the optical transceiver module 108 can comprise an optical transmitter 109 configured to modulate an optical radiation with a variation of its polarization angle. In particular, the variation of the angle of polarization assumed by the optical radiation over time, is a function of the signal or data received at the input of said optical transmitter 109, in particular also of the data received through the connection with the radio frequency module 105 in the above described form. In this case also the optical receiver 110 will be a receiver configured to demodulate an optical radiation received at the input, in particular in the context of the communication on optical channel 400a, 400b as defined in the invention, in which the demodulation is also performed through a measurement or analysis of the angle of polarization assumed by the optical radiation received over time.

In order to find the minimum request of radio resources, a particular configuration of the data transceiving electronic device 100 object of the present invention is such as to select said optical transceiver module 108 as the preferential priority module for the establishment of communication with at least an electronic device 301; 302. The establishment of the optical communication as a priority optical communication is conveniently managed through the data processing unit 104 and follows a process that is described below and shown in FIG. 2.

In particular, the establishment of the communication between the data transceiving electronic device 100 and at least an electronic device 301, 302, comprises the execution of a decision step of preferential establishment of communication channel (FIG. 2, block 1003), in which the optical channel 400a, 400b is electronically established between the data transceiving electronic device 100 and at least an electronic device 301; 302 with an alternative preferred selection (FIG. 2, block 1005) with respect to the establishment (FIG. 2, block 1004) of the communication on the radio frequency channel 200 between the data transceiving electronic device 100 and at least an electronic device 301; 302. In this way, the optical communication is advantaged, more effective than radio frequency communication.

Figure 2:
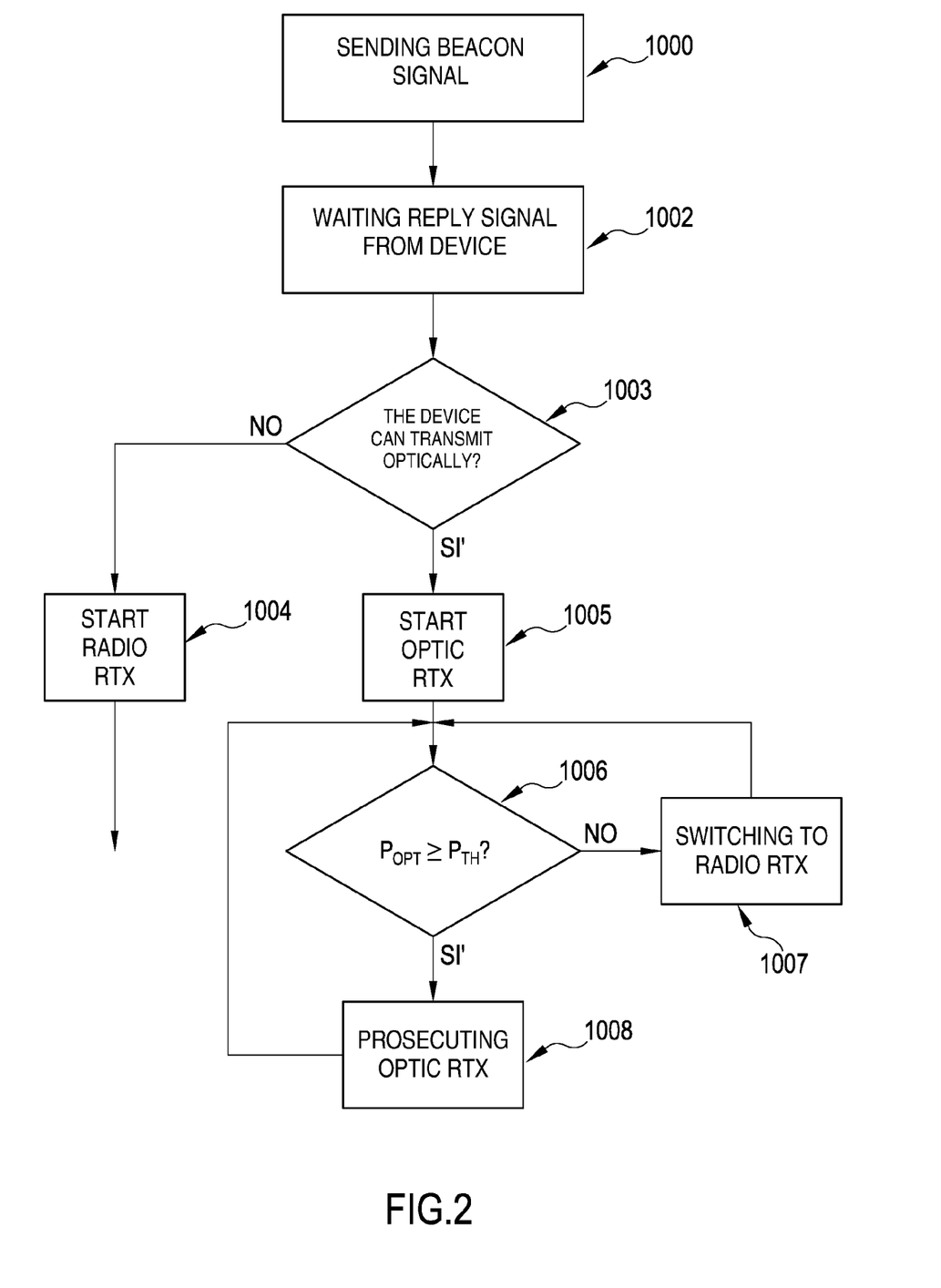
FIG. 2 shows a flowchart related to an operating process of the electronic data transceiver according to the invention.

In particular, the method follows a generation, preferably by the data transceiving electronic device 100, of a querying signal or beacon signal (FIG. 2, block 1000) followed by a waiting step (FIG. 2, block 1002) for the transmission of a response signal by at least an electronic device 301; 302. The transmission of the querying or beacon signal takes place in a particular operational configuration of the data transceiving electronic device 100, which is in particular a search operational configuration, more in detail a search for electronic devices with optical and/or radio frequency wireless communication. The transmission of the querying signal or beacon can be:

- only on a radio frequency channel, or
- only on an optical channel, or
- both on the radio frequency channel and on the optical channel, in particular when simultaneously occurring on both the radio frequency channel 200 and the optical channel 400a, 400b with simultaneous activation of the radio frequency module 105 and of the optical transceiver module 108. This last configuration guarantees particular operational flexibility, for the rapid and complete search of all the electronic devices located near the electronic data transceiver device.

The electronic device 301, 302, can be, depending on its particular type, equipped with either a radio frequency module, for example and non-limiting to a WiFi module, or an optical transceiver module, or both radio frequency modules and optical transceiver. In the first case it is clear that the unstable communication with the data transceiving electronic device 100 can not ignore the fact that it is a wireless communication on radio frequency channel. In the second case, it is also clear that unstable communication with the data transceiving electronic device 100 cannot be separated from wireless communication on an optical channel. In the third case, however, the electronic device 301, 302 could alternatively select radio frequency or optical channel communication. Preferably, the electronic device 301, 302, particularly when equipped with both radio frequency modules and optical transceiver, can be configured to transmit, as a response signal or within the response signal, a data related to which modules are present in it. When equipped with both radio frequency and optical transceiver modules, the electronic device 301, 302 can be advantageously configured to respond, in particular automatically, alternately to the optical querying or search signal or to the radio frequency querying or search signal, ensuring that the querying data transceiving electronic device 100 knows with which hardware configuration the electronic device 301, 302 can operate.

In this way:
If the response signal is a radio-frequency signal or carries data related only to the possibility for the electronic device 301, 302 to establish a communication on a radio-frequency channel, the step of establishing the communication comprises the establishment of the communication on said radio-frequency channel 200;
if the response signal is an optical signal, or carries data related to the possibility, for the electronic device 301, 302, to establish a communication on an optical channel, the step of establishing the communication comprises the establishment of the communication on said optical channel 400a, 400b, and
if the response signal is a radio-frequency signal but carries data related to the possibility for said electronic device 301, 302 to establish a communication on an optical channel, the step of establishing the communication comprises the establishment of the communication on said optical channel 400a, 400b, precisely as a priority channel of communication.

That means that said data transceiving electronic device 100 is configured to select said radio-frequency module 105 as a secondary module for the establishment of the communication with at least an electronic device 301, 302 and for the establishment of said communication on a radio-frequency channel when the establishment of said communication on an optical channel with the electronic device 301, 302 is not possible and/or when the power of an optical signal received on said communication on the optical channel falls below a predefined threshold value Pth.

In particular, it can happen that when communication is established on the optical channel 400a, 400b, due to a movement of the electronic device related to data transceiving electronic device 100, the Popt power of the optical signal used to maintain the aforementioned communication falls below a threshold value such as to no longer ensure that the electronic data can be properly received or exchanged between the two devices. In order to ensure the keeping of a continuous communication, in particular between the two devices, the Applicant has designed an algorithm or method of operation such that following the establishment of the optical communication (FIG. 2, block 1005), through the data processing unit 104 the data transceiving electronic device 100 performs iteratively, at predefined time intervals, for example and in a non-limiting extent every 2 seconds or every 30 seconds, a measurement of the optical power Popt for the signal received from said electronic device 301, preferably followed immediately by a comparison step, in particular an electronic comparison performed by the data processing unit 104 or by the optical transceiver module 108 through the data processing unit, of the optical power measured with a predetermined threshold value Pth, which is previously stored in a memory contained in the data transceiving electronic device 100 and which is defined, for example, according to the specific type of sensor used by the optical receiver 110.

If the optical power Popt of the communication drops below the predetermined threshold value Pth (FIG. 2, block 1006, output N), the data transceiving electronic device 100 is configured such as to cause a switching, preferably an immediate switching, on the radio frequency channel 200 (FIG. 2, block 1007)—whenever possible and that is when the electronic device 301, 302 is equipped with a radio frequency module. Also in this case, and therefore after switching to a radio frequency channel, the data transceiving electronic device 100 preferably keeps active the measurement of optical power Popt to re-establish as soon as possible the data transceiving on optical channel. This is shown in FIG. 2 by the output feedback from block 1007 upstream of block 1006. As soon as the optical power Popt returns above the threshold value Pth, or as long as the optical power Popt remains above the threshold value Pth, the communication is kept or if necessary switched to the optical channel.

Advantageously, also the portable electronic device 301, 302, can be configured and/or equipped with a firmware or software application such that the optical power Popt is monitored, in order to promptly cause the sending, to the data transceiving electronic device 100, of a request data for switching from the optical channel to the radio frequency channel or, alternatively, in order to cause the immediate switching of the communication on said radio frequency channel.

Therefore, both on the data transceiving electronic device 100 and on the electronic devices 301, 302 can be installed an application, also in the form of an SDK, which is a computer program, suitable for being executed on at least a data processing unit of an electronic device 100; 301; 302 having a radio frequency module, configured to permit the establishment of a wireless radio frequency channel data transceiving with an additional remote electronic device, and an optical transceiver module, configured to permit the establishment of an optical channel data transceiving with an additional remote electronic device, wherein the computer program comprises portions of software which, when executed by said data-processing unit, cause a priority activation and/or selection of the optical transceiver module for the establishment of said communication with said additional electronic device, where optical communication is kept, as long as possible, in priority way with respect to the communication on said radio-frequency channel.

In particular, said computer program comprises portions of software code which, when executed on said data-processing unit, cause the execution of a repeated electronic measurement of the Popt power of an optical signal received from an optical receiver of said optical transceiver module and automatically cause the switching of the pre-established optical channel communication towards a radio frequency channel communication when the Popt power of the optical signal falls below a pre-established Pth threshold value previously stored in a memory operationally accessible by said data-processing unit and automatically cause communication to be switched to a radio-frequency channel when the Popt power of the optical signal rises above said predetermined Pth threshold value and/or causes that communication to be kept on said optical channel for as long as the popt power of said optical signal remains above said predetermined Pth threshold value.

Parts of the process or method described in the present invention can—where possible—be implemented by means of a data-processing unit, technically replaceable by one or more computers designed to run a predefined portion of the software program or firmware and loaded onto a non-transitory memory support. Said software program can be written in any known programming language. If the number of computers is two or more, they can be connected to each other by a data connection such that their computing powers are in any way shared; the computers themselves can therefore be installed in positions which are also geographically different.

The data processing unit can be a general purpose processor specifically configured through said software or firmware program to perform one or more parts of the method identified in the present invention, or a dedicated ASIC or processor, specifically programmed to perform at least part of the operations of the method or process of the present invention.

The non-transitory memory support to contain the aforesaid portion of software program or firmware can be internal or external to the processor itself, possibly external to the computer, and can—specifically—be a memory geographically remote from the computer. The memory support can also be physically divided, in the form of a "cloud". "Non-transitory" means a computer readable storage medium, in which data storage is temporally kept for a predefined time, albeit variable on the basis of power and/or environmental conditions, and is a tangible medium. The above definition of "non-transitory" memory support excludes supports such as the atmosphere, or an electrically conductive or light-conducting support—e.g. optical fibre—in which an electromagnetic signal, in whatever form, passes for a time not equal to zero because of the limited and not infinite speed of propagation of the signal on the support itself.

Finally, it is clear that the object of the present invention may be subject to modifications, additions or variants, which are obvious to an expert in the art, without thereby falling outside of the scope of protection provided by the attached claims.

The invention claimed is:

1. A data transceiving electronic device, comprising:
a radio frequency module configured to receive and transmit electronic data on a wireless channel according to at least a predefined first wireless communication standard; and
an optical transceiver module comprising at least an optical transmitter and an optical receiver;
wherein said data transceiving electronic device is configured to select said optical transceiver module as the preferential priority module for the establishment of said communication with said at least an electronic device;
wherein said data transceiving electronic device is configured to allow the establishment of at least a communication with at least an electronic device remotely positioned with respect to said data transceiving device;
wherein said optical transceiver module comprises at least an optical power comparator configured to compare the power of an optical signal used for said communication on the optical channel with a predefined threshold value; said optical power comparator being configured to cause a switching of said communication from said optical channel to said radio-frequency channel when the power of said optical signal remains below said predefined threshold value; and
wherein said optical power comparator is configured to keep said communication on said radio-frequency channel as long as the optical signal power remains below said predefined threshold value;
the device being configured to iteratively and automatically attempt the establishment of the communication on the optical channel and/or the re-establishment of the communication on the optical channel when the optical signal power is greater than said predefined threshold value.

2. The data transceiving electronic device according to claim 1, configured to select said radio-frequency module as secondary module for the establishment of said communication with at least an electronic device and for the establishment of said communication on a radio-frequency channel when the establishment of said communication on an optical channel with said electronic device is not possible and/or when the power of an optical signal received on said communication on the optical channel falls below a predefined threshold value.

3. The data transceiving electronic device according to claim 1, configured to iteratively attempt the establishment of the communication on the optical channel and/or the re-establishment of the communication on the optical channel at predefined time intervals, and/or configured to cause the sending of a search optical signal for electronic devices by means of said optical transceiver module.

4. The data transceiving electronic device according to claim 1, wherein said optical transceiver module has at least an operative configuration for searching for remote electronic devices in which it cyclically transmits, by means of the optical transmitter, an optical signal for searching for electronic devices and wherein the optical transceiver module is configured to establish said communication on the optical channel, when an optical response signal from at least one of said remote electronic devices has been received.

5. The data transceiving electronic device according to claim 4, wherein said data-processing unit is configured to control the optical transceiver module in said operative configuration of searching for remote electronic devices when a radio-frequency and/or optical communication is already established on said radio-frequency and/or optical channel respectively.

6. The data transceiving electronic device according to claim 1, comprising a data-processing unit electrically connected to said radio-frequency module and to said optical transceiver module;
wherein said radio frequency module is configured to transmit data signals according to, and/or in accordance with, a plurality of pre-defined data transmission protocols and wherein said data processing unit is configured to select and/or activate said optical transceiver module as priority module with respect to said radio frequency module.

7. The data transceiving electronic device according to claim 1, the data transceiving electronic device being a multi-communicator device, configured to establish and/or keep simultaneous communications on a plurality of channels, said channels being optical and/or radio frequency channels, and/or wherein said optical transceiver module is configured to manage a plurality of simultaneous optical communications on a plurality of optical channels.

8. The data transceiving electronic device according to claim 1, wherein said optical channels comprise logic channels divided by time division or time division multiplexing and/or wherein said optical channels comprise logic channels subdivided with orthogonal frequency multiplexing technology.

9. The data transceiving electronic device according to claim 1, wherein said optical transmitter comprises a photo-emitter capable of being tuned to a plurality of frequencies and/or colours; or
wherein said optical transmitter comprises a plurality of monochromatic photo-emitters, in particular at least a first and a second monochromatic photo-emitter, wherein the first monochromatic photo-emitter operates on a first predetermined wavelength or frequency or colour, and wherein the second monochromatic photo-emitter operates on a second predetermined wavelength or frequency or colour.

10. The data transceiving electronic device according to claim 1, wherein said optical transceiver module comprises:
an input electrically connected to the radio frequency module; and
at least an operating configuration in which the optical transmitter transmits an optical signal modulated by means of said radio frequency signal.

11. The data transceiving electronic device according to claim 1, wherein said optical signal is a signal modulated according to a hybrid AM/FM modulation scheme and/or wherein said optical transmitter is a hybrid AM/FM optical transmitter.

12. The data transceiving electronic device according to claim 1, further comprising a network interface operationally and preferably electrically connected to said radio frequency module and to said optical transceiver module, said network interface having an input/output port through which, in use, said data transceiving electronic device is configured to transmit electronic data on a communication network.

13. The data transceiving electronic device according to claim 1, wherein said radio frequency module comprises at least a first antenna, and optionally a second antenna, for transceiving of said radio frequency signal;
wherein the first antenna is an antenna resonating on a first band of radio frequencies and the second antenna is an antenna resonating on a second band of radio frequencies; said first band of radio frequencies being distinct or separated from the second band of radio frequencies.

14. A method of data transceiving, comprising:
a step of establishment of a data communication between a data transceiving electronic device, configured to handle wireless communications on a radio frequency channel and/or on an optical channel, and at least an electronic device remotely positioned with respect to said data transceiving electronic device, wherein said data communication is an at least partially wireless communication;
a subsequent step of transmission of at least part of a data signal through said data communication previously established;
wherein the step of establishment of the data communication comprises the prioritary establishment of an optical communication by means of a decision step for the establishment of a preferential communication channel, wherein said optical channel is electronically established between said data transceiving electronic device and said at least an electronic device with an alternative selection preferential with respect to the establishment of the communication on said radio-frequency channel between said data transceiving electronic device and said at least an electronic device;
a measurement step of an optical power on optical signals exchanged on said optical channel, and comprising the comparison of said optical power with a predetermined threshold value of optical power; and
a step of switching the data communication from said optical channel to said radio frequency channel when the optical power is lower than said threshold value and comprises a step of searching for the re-establishment of said optical communication wherein the communication is automatically brought from said radio frequency channel to optical channel when the optical power is again higher than said threshold value.

15. The method according to claim 14, wherein said step of searching for the re-establishment of said optical communication comprises the sending of a querying optical signal between said data transceiving electronic device and said electronic device; wherein said querying optical signal is sent by said data transceiving electronic device, in particular by an optical transmitter of an optical transceiver module of said transceiver.

16. The method according to claim 15, further comprising a step of searching for electronic devices capable of establishing a wireless communication on an optical channel, said step of searching comprising a transmission of a search or querying signal and a step of waiting for the transmission of a response signal by at least an electronic device;
wherein said step of searching is a step cyclically executed at predetermined instants of time and/or wherein the transmission of the searching or querying signal, in said step, is executed at predetermined instants of time; and
wherein, following the reception of said response signal, a decision step is taken to establish a preferential communication channel wherein:
if the response signal is a radio-frequency signal or carries data related to the only possibility for said electronic device to establish a communication on a radio-frequency channel, the step of establishment of the communication comprises the establishment of the communication on said radio-frequency channel;
if the response signal is an optical signal, or carries data related to the possibility for said electronic device to establish the communication on an optical channel, the step of establishment of the communication comprises the establishment of the communication on said optical channel.

17. The method according to claim 14, further comprising a step of establishment of at least a first and a second simultaneous communication, each of which is established between the transceiver and, respectively, a first electronic device and a second electronic device, said first and said second communication being both on optical channel.

* * * * *